United States Patent
Allen et al.

(10) Patent No.: US 12,469,090 B2
(45) Date of Patent: *Nov. 11, 2025

(54) SOCIAL MEDIA POST SUBSCRIBE REQUESTS FOR BUFFER USER ACCOUNTS

(71) Applicant: Snap Inc., Santa Monica, CA (US)

(72) Inventors: Nicholas R. Allen, Santa Monica, CA (US); Joseph Burfitt, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/608,366

(22) Filed: Mar. 18, 2024

(65) Prior Publication Data

US 2024/0223568 A1 Jul. 4, 2024

Related U.S. Application Data

(63) Continuation of application No. 17/885,307, filed on Aug. 10, 2022, now Pat. No. 11,962,598, which is a continuation of application No. 16/800,868, filed on Feb. 25, 2020, now Pat. No. 11,438,341, which is a
(Continued)

(51) Int. Cl.
*H04L 51/52* (2022.01)
*G06Q 50/00* (2012.01)
*H04L 9/40* (2022.01)
*H04L 67/306* (2022.01)

(52) U.S. Cl.
CPC ............ *G06Q 50/01* (2013.01); *H04L 51/52* (2022.05); *H04L 63/102* (2013.01); *H04L 67/306* (2013.01); *H04L 63/105* (2013.01)

(58) Field of Classification Search
CPC ......... G06Q 50/01; H04L 51/52; H04L 51/48; H04L 67/306
See application file for complete search history.

(56) References Cited

U.S. PATENT DOCUMENTS

| | | |
|---|---|---|
| 5,754,939 A | 5/1998 | Herz et al. |
| 5,880,731 A | 3/1999 | Liles et al. |
| 6,023,270 A | 2/2000 | Brush, II et al. |

(Continued)

FOREIGN PATENT DOCUMENTS

| | | |
|---|---|---|
| CA | 2887596 A1 | 7/2015 |
| CN | 1093277 C | 10/2002 |

(Continued)

OTHER PUBLICATIONS

U.S. Appl. No. 15/169,288 U.S. Pat. No. 10,474,353, filed May 31, 2016, Application Control Using a Gesture Based Trigger.

(Continued)

*Primary Examiner* — Jason D Cardone
(74) *Attorney, Agent, or Firm* — Schwegman Lundberg & Woessner, P.A.

(57) ABSTRACT

An approach for publishing posts on a social network through one or more user accounts with different levels of attribution is disclosed. A secure user account publishes a post through a programmatically linked buffer user account. The secure user account and the buffer user account are programmatically linked. Posts published via the buffer user account can be modified to add attribution image data or other visual indicators of the original post creator.

20 Claims, 12 Drawing Sheets

Related U.S. Application Data continuation of application No. 15/289,676, filed on Oct. 10, 2016, now Pat. No. 10,609,036.

(56) References Cited

U.S. PATENT DOCUMENTS

| | | |
|---|---|---|
| 6,038,295 A | 3/2000 | Mattes |
| 6,158,044 A | 12/2000 | Tibbetts |
| 6,167,435 A | 12/2000 | Druckenmiller et al. |
| 6,205,432 B1 | 3/2001 | Gabbard et al. |
| 6,223,165 B1 | 4/2001 | Lauffer |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,772,195 B1 | 8/2004 | Hatlelid et al. |
| 6,842,779 B1 | 1/2005 | Nishizawa |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,342,587 B2 | 3/2008 | Danzig et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,468,729 B1 | 12/2008 | Levinson |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,636,755 B2 | 12/2009 | Blattner et al. |
| 7,639,251 B2 | 12/2009 | Gu et al. |
| 7,703,140 B2 | 4/2010 | Nath et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 7,971,156 B2 | 6/2011 | Albertson et al. |
| 7,996,793 B2 | 8/2011 | Latta et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,487,938 B2 | 7/2013 | Latta et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,907 B2 | 10/2013 | Garcia, Jr. et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,745,132 B2 | 6/2014 | Obradovich |
| 8,810,513 B2 | 8/2014 | Ptucha et al. |
| 8,812,171 B2 | 8/2014 | Filev et al. |
| 8,825,773 B1 * | 9/2014 | Gauvin ............... H04L 67/306 709/229 |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,691 B2 | 10/2014 | Geisner et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,224,095 B2 | 12/2015 | Booth et al. |
| 9,225,805 B2 | 12/2015 | Kujawa et al. |
| 9,225,897 B1 | 12/2015 | Sehn et al. |
| 9,230,160 B1 | 1/2016 | Kanter |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |

(56) References Cited

U.S. PATENT DOCUMENTS

| | | |
|---|---|---|
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,083,469 B1 * | 9/2018 | Traina .................. G06Q 50/01 |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,284,508 B1 | 5/2019 | Allen et al. |
| 10,291,573 B2 | 5/2019 | Ravishankar et al. |
| 10,362,219 B2 | 7/2019 | Wilson et al. |
| 10,439,972 B1 | 10/2019 | Spiegel et al. |
| 10,474,353 B2 | 11/2019 | Burfitt |
| 10,475,225 B2 | 11/2019 | Park et al. |
| 10,504,266 B2 | 12/2019 | Blattner et al. |
| 10,509,466 B1 | 12/2019 | Miller et al. |
| 10,514,876 B2 | 12/2019 | Sehn |
| 10,573,048 B2 | 2/2020 | Ni et al. |
| 10,579,869 B1 | 3/2020 | Xiong et al. |
| 10,609,036 B1 | 3/2020 | Allen et al. |
| 10,614,855 B2 | 4/2020 | Huang |
| 10,623,353 B2 * | 4/2020 | Yang .................. H04L 51/066 |
| 10,657,701 B2 | 5/2020 | Osman et al. |
| 10,748,347 B1 | 8/2020 | Li et al. |
| 10,884,616 B2 | 1/2021 | Burfitt |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,169,699 B2 | 11/2021 | Burfitt |
| 11,227,626 B1 | 1/2022 | Krishnan Gorumkonda et al. |
| 11,307,747 B2 | 4/2022 | Dancie et al. |
| 11,438,341 B1 | 9/2022 | Allen et al. |
| 11,531,402 B1 | 12/2022 | Stolzenberg |
| 11,546,505 B2 | 1/2023 | Canberk |
| 11,662,900 B2 | 5/2023 | Burfitt |
| 11,716,398 B1 * | 8/2023 | Crosby .................. H04W 8/183 709/223 |
| 11,962,598 B2 | 4/2024 | Allen et al. |
| 12,131,015 B2 | 10/2024 | Burfitt |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0100479 A1 | 5/2004 | Nakano et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0082941 A1 | 4/2008 | Goldberg et al. |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0012788 A1 | 1/2009 | Gilbert et al. |
| 2009/0013266 A1 | 1/2009 | Gandhi et al. |
| 2009/0016617 A1 | 1/2009 | Bregman-Amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0042948 A1 | 2/2010 | Kim et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0301934 A1 | 12/2011 | Tardif |
| 2011/0320373 A1 | 12/2011 | Lee et al. |
| 2012/0028659 A1 | 2/2012 | Whitney et al. |
| 2012/0113106 A1 | 5/2012 | Choi et al. |
| 2012/0117584 A1 | 5/2012 | Gordon |
| 2012/0124458 A1 | 5/2012 | Cruzada |
| 2012/0130717 A1 | 5/2012 | Xu et al. |

(56) References Cited

U.S. PATENT DOCUMENTS

| | | |
|---|---|---|
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0024808 A1 | 1/2013 | Rainisto |
| 2013/0071093 A1 | 3/2013 | Hanks et al. |
| 2013/0103760 A1 | 4/2013 | Golding et al. |
| 2013/0187873 A1 | 7/2013 | Jeong |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0082078 A1* | 3/2014 | Dunn .................. H04L 67/306 709/204 |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2014/0201527 A1 | 7/2014 | Krivorot |
| 2014/0282096 A1* | 9/2014 | Rubinstein ............ H04L 65/403 715/753 |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0365349 A1 | 12/2014 | Kennon |
| 2015/0120293 A1 | 4/2015 | Wohlert et al. |
| 2015/0128014 A1 | 5/2015 | Monroe |
| 2015/0188873 A1 | 7/2015 | Halliday et al. |
| 2015/0193122 A1 | 7/2015 | Liu et al. |
| 2015/0199082 A1 | 7/2015 | Scholler et al. |
| 2015/0199669 A1* | 7/2015 | Ramirez ................. H04L 69/28 705/319 |
| 2015/0206349 A1 | 7/2015 | Rosenthal et al. |
| 2015/0227602 A1 | 8/2015 | Ramu et al. |
| 2015/0269614 A1 | 9/2015 | Kramer |
| 2015/0370320 A1 | 12/2015 | Connor |
| 2016/0055250 A1* | 2/2016 | Rush .................. G06F 16/9535 707/733 |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0132194 A1* | 5/2016 | Grue ..................... G06F 3/0482 715/810 |
| 2016/0134840 A1 | 5/2016 | Mcculloch |
| 2016/0170623 A1 | 6/2016 | Lewis et al. |
| 2016/0180887 A1 | 6/2016 | Sehn |
| 2016/0196584 A1* | 7/2016 | Franklin ............. G06Q 30/0269 715/745 |
| 2016/0234149 A1 | 8/2016 | Tsuda et al. |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0155613 A1* | 6/2017 | Ganci, Jr. ............. H04L 67/306 |
| 2017/0161382 A1 | 6/2017 | Ouimet et al. |
| 2017/0180299 A1* | 6/2017 | Garza .................. H04L 51/52 |
| 2017/0199855 A1 | 7/2017 | Fishbeck |
| 2017/0235848 A1 | 8/2017 | Van Dusen et al. |
| 2017/0263029 A1 | 9/2017 | Yan et al. |
| 2017/0277684 A1 | 9/2017 | Dharmarajan Mary |
| 2017/0277685 A1 | 9/2017 | Takumi |
| 2017/0287006 A1 | 10/2017 | Azmoodeh et al. |
| 2017/0295250 A1 | 10/2017 | Samaranayake et al. |
| 2017/0308283 A1* | 10/2017 | Seif ...................... G06Q 20/223 |
| 2017/0310934 A1 | 10/2017 | Du et al. |
| 2017/0312634 A1 | 11/2017 | Ledoux et al. |
| 2017/0344246 A1 | 11/2017 | Burfitt |
| 2017/0351910 A1 | 12/2017 | Elwazer et al. |
| 2017/0374003 A1 | 12/2017 | Allen et al. |
| 2017/0374508 A1 | 12/2017 | Davis et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0158370 A1 | 6/2018 | Pryor |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0249831 A1 | 8/2020 | Burfitt |
| 2021/0011612 A1 | 1/2021 | Dancie et al. |
| 2021/0074016 A1 | 3/2021 | Li et al. |
| 2021/0089204 A1 | 3/2021 | Burfitt |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0171527 A1 | 6/2022 | Burfitt |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2022/0386084 A1 | 12/2022 | Allen et al. |
| 2023/0244375 A1 | 8/2023 | Burfitt |

FOREIGN PATENT DOCUMENTS

| | | |
|---|---|---|
| CN | 103049761 B | 8/2016 |
| CN | 109564500 A | 4/2019 |
| CN | 109863532 A | 6/2019 |
| CN | 110168478 A | 8/2019 |
| CN | 109564500 B | 4/2022 |
| EP | 2184092 A2 | 5/2010 |
| EP | 3465404 B1 | 6/2020 |
| EP | 3707693 A1 | 9/2020 |
| EP | 3734433 B1 | 10/2022 |
| JP | 2001230801 A | 8/2001 |
| JP | 5497931 B2 | 3/2014 |
| KR | 20130024808 A | 3/2013 |
| KR | 101445263 B1 | 9/2014 |
| KR | 102221488 B1 | 3/2021 |
| KR | 20220158824 | 12/2022 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016168591 A1 | 10/2016 |
| WO | WO-2016179166 A1 | 11/2016 |
| WO | WO-2016179235 A1 | 11/2016 |

(56) References Cited

FOREIGN PATENT DOCUMENTS

| WO | WO-2017176739 A1 | 10/2017 |
|---|---|---|
| WO | WO-2017176992 A1 | 10/2017 |
| WO | WO-2017210129 A1 | 12/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2019094618 A1 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

U.S. Appl. No. 16/597,797 U.S. Pat. No. 10,884,616, filed Oct. 9, 2019, Application Control Using a Gesture Based Trigger.
U.S. Appl. No. 17/115,268 U.S. Pat. No. 11,169,699, filed Dec. 8, 2020, Application Control Using a Gesture Based Trigger.
U.S. Appl. No. 17/520,454 U.S. Pat. No. 11,662,900, filed Nov. 5, 2021, Application Control Using a Gesture Based Trigger.
U.S. Appl. No. 18/132,755, filed Apr. 10, 2023, Application Control Using a Gesture Based Trigger.
U.S. Appl. No. 15/289,676 U.S. Pat. No. 10,609,036, filed Oct. 10, 2016, Social Media Post Subscribe Requests for Buffer User Accounts.
U.S. Appl. No. 16/800,868 U.S. Pat. No. 11,438,341, filed Feb. 25, 2020, Social Media Post Subscribe Requests for Buffer User Accounts.
U.S. Appl. No. 17/885,307, filed Aug. 10, 2022, Social Media Post Subscribe Requests for Buffer User Accounts.
"1-Click—Wikipedia, the free encyclopedia", [Online]. Retrieved from the Internet: <URL: https://en.wikipedia.org/wiki/1 -Click>, (Accessed May 26, 2016), 3 pgs.
"U.S. Appl. No. 15/169,288, Non Final Office Action mailed Oct. 18, 2018", 13 pgs.
"U.S. Appl. No. 15/169,288, Notice of Allowance mailed Jul. 2, 2019", 9 pgs.
"U.S. Appl. No. 15/169,288, Response filed Mar. 18, 2019 to Non Final Office Action mailed Oct. 18, 2018", 16 pgs.
"U.S. Appl. No. 15/289,676, Final Office Action mailed Jul. 15, 2019", 20 pgs.
"U.S. Appl. No. 15/289,676, Non Final Office Action mailed Oct. 25, 2018", 16 pgs.
"U.S. Appl. No. 15/289,676, Notice of Allowance mailed Nov. 18, 2019", 18 pgs.
"U.S. Appl. No. 15/289,676, Response filed Apr. 24, 2019 to Non Final Office Action mailed Oct. 25, 2018", 21 pgs.
"U.S. Appl. No. 15/289,676, Response filed Oct. 15, 2019 to Final Office Action mailed Jul. 15, 2019", 24 pgs.
"U.S. Appl. No. 16/597,797, Corrected Notice of Allowability mailed Oct. 19, 2020", 2 pgs.
"U.S. Appl. No. 16/597,797, Corrected Notice of Allowability mailed Dec. 11, 2020", 2 pgs.
"U.S. Appl. No. 16/597,797, Notice of Allowance mailed Sep. 2, 2020", 16 pgs.
"U.S. Appl. No. 16/597,797, Preliminary Amendment filed Apr. 29, 2020", 8 pgs.
"U.S. Appl. No. 16/800,868, Final Office Action mailed Feb. 4, 2022", 24 pgs.
"U.S. Appl. No. 16/800,868, Non Final Office Action mailed Jun. 23, 2021", 25 pgs.
"U.S. Appl. No. 16/800,868, Notice of Allowance mailed Apr. 26, 2022", 9 pgs.
"U.S. Appl. No. 16/800,868, Preliminary Amendment filed May 12, 2020", 8 pgs.
"U.S. Appl. No. 16/800,868, Response filed Apr. 5, 2022 to Final Office Action mailed Feb. 4, 2022", 12 pgs.
"U.S. Appl. No. 16/800,868, Response filed Oct. 25, 2021 to Non Final Office Action mailed Jun. 23, 2021", 12 pgs.
"U.S. Appl. No. 17/115,268, Corrected Notice of Allowability mailed Oct. 18, 2021", 2 pgs.
"U.S. Appl. No. 17/115,268, Notice of Allowance mailed Jul. 8, 2021", 14 pgs.
"U.S. Appl. No. 17/520,454, Corrected Notice of Allowability mailed Feb. 9, 2023", 2 pgs.
"U.S. Appl. No. 17/520,454, Non Final Office Action mailed Sep. 15, 2022", 16 pgs.
"U.S. Appl. No. 17/520,454, Notice of Allowance mailed Jan. 25, 2023", 9 pgs.
"U.S. Appl. No. 17/520,454, Preliminary Amendment filed Feb. 17, 2022", 6 pgs.
"U.S. Appl. No. 17/520,454, Response filed Dec. 13, 2022 to Non Final Office Action mailed Sep. 15, 2022", 10 pgs.
"U.S. Appl. No. 17/885,307, Final Office Action mailed Oct. 2, 2023", 17 pgs.
"U.S. Appl. No. 17/885,307, Non Final Office Action mailed Feb. 8, 2023", 18 pgs.
"U.S. Appl. No. 17/885,307, Notice of Allowance mailed Dec. 18, 2023", 17 pgs.
"U.S. Appl. No. 17/885,307, Response filed Jun. 7, 2023 to Non Final Office Action mailed Feb. 8, 2023", 11 pgs.
"U.S. Appl. No. 17/885,307, Response filed Nov. 10, 2023 to Final Office Action mailed Oct. 2, 2023", 12 pgs.
"Chinese Application Serial No. 201780046815.5, Office Action mailed Jul. 30, 2021", w/ English translation, 10 pgs.
"Chinese Application Serial No. 201780046815.5,Response filed Dec. 30, 2021 to Office Action mailed Jul. 30, 2021", w/ English claims, 11pgs.
"European Application Serial No. 17729970.9, Response filed Jul. 22, 2019 to Communication pursuant to Rules 161(1) and 162 EPC mailed Jan. 10, 2019", w/ English Claims, 76 pgs.
"European Application Serial No. 20181733.5, Extended European Search Report mailed Sep. 24, 2020", 8 pgs.
"European Application Serial No. 20181733.5, Response filed Apr. 29, 2021 to Extended European Search Report mailed Sep. 24, 2020", 28 pgs.
"European Application Serial No. 22203697.2, Extended European Search Report mailed Jan. 20, 2023", 8 pgs.
"International Application Serial No. PCT/US2017/034782, International Preliminary Report on Patentability mailed Dec. 13, 2018", 9 pgs.
"International Application Serial No. PCT/US2017/034782, International Search Report mailed Oct. 4, 2017", 3 pgs.
"International Application Serial No. PCT/US2017/034782, Written Opinion mailed Oct. 4, 2017", 7 pgs.
"Korean Application Serial No. 10-2018-7038039, Notice of Preliminary Rejection mailed Mar. 31, 2020", w/ English translation, 9 pgs.
"Korean Application Serial No. 10-2018-7038039, Response filed Jun. 15, 2020 to Notice of Preliminary Rejection mailed Mar. 31, 2020", w/ English Claims, 26 pgs.
Bias, Lorena, et al., "Kim Kardashian Robbery Puts Spotlight on Celebrity Security", USA Today, D.2. ProQuest., [Online] Retrieved from the Internet on Nov. 9, 2019: <URL: http://dialog.proquest.com/professional/docview/1825640504?accountid=131444>, (Oct. 4, 2016), 4 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

(56) References Cited

OTHER PUBLICATIONS

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.

Shein, Esther, "Ephemeral Data", Communications of the ACM, vol. 56, No. 9, (Sep. 2013), 3 pgs.

Vaas, Lisa, "Stealth Text, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.

"U.S. Appl. No. 18/132,755, Non Final Office Action mailed Mar. 8, 2024", 19 pgs.

"U.S. Appl. No. 18/132,755, Examiner Interview Summary mailed Jun. 7, 2024", 3 pgs.

"U.S. Appl. No. 18/132,755, Response filed Jun. 5, 2024 to Non Final Office Action mailed Mar. 8, 2024", 10 pgs.

"U.S. Appl. No. 18/132,755, Notice of Allowance mailed Jun. 26, 2024", 9 pgs.

\* cited by examiner

SOCIAL MEDIA POST SUBSCRIBE REQUESTS FOR BUFFER USER ACCOUNTS

CLAIM OF PRIORITY

This application is a continuation of U.S. patent application Ser. No. 17/885,307, filed on Aug. 10, 2022, which is a continuation of U.S. patent application Ser. No. 16/800,868, filed on Feb. 25, 2020, now issued as U.S. Pat. No. 11,438,341, which is a continuation of U.S. patent application Ser. No. 15/289,676, filed on Oct. 10, 2016, now issued as U.S. Pat. No. 10,609,036, each of which are incorporated herein by reference in their entireties.

TECHNICAL FIELD

Embodiments of the present disclosure relate generally to publishing Internet messages and, more particularly, but not by way of limitation, to user attribution of posts.

BACKGROUND

In recent years, many users follow social media posts from popular social media users. For example, a person may use his/her social media account to receive and view social media posts published by the person's favorite musician. Other examples of popular social media users include high-profile individuals (e.g., actors/actresses, politicians, astronauts) and organizations (e.g., sports leagues, companies, clubs, political parties). Users prefer to receive candid posts that appear to have been directly published by the popular users instead of heavily tailored posts published from public relations (PR) accounts. However, it has been difficult to manage popular user account access in a way that maintains privacy and security of the popular users while maintaining post candidness and authenticity.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
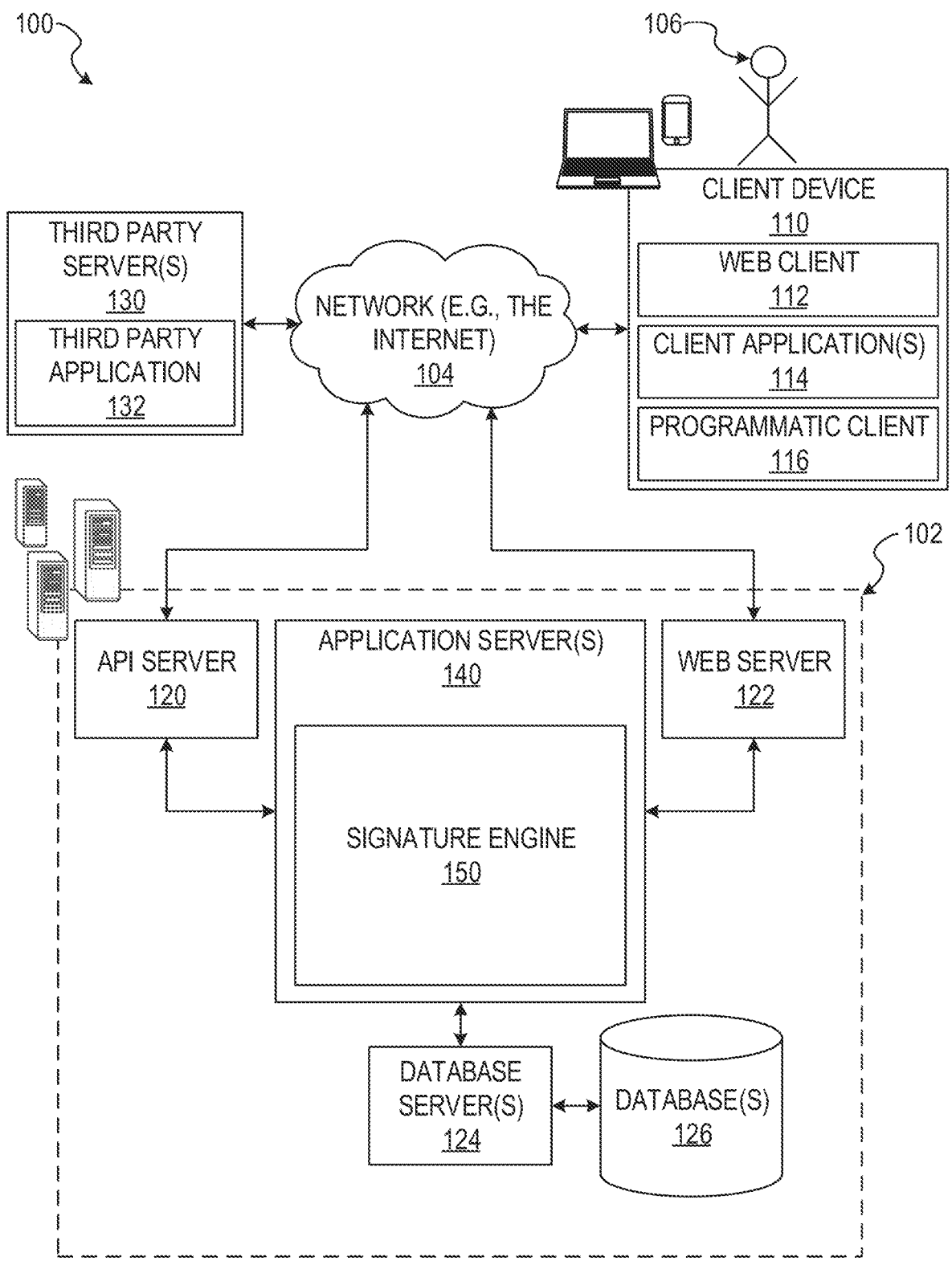
FIG. 1 is a block diagram illustrating a signature engine implemented in a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a signature engine is implemented to programmatically link two user accounts of a social media platform. According to some example embodiments, one of the programmatically linked user accounts is a secure user account and the other is a buffer user account. The secure user account is the account of the high-profile user, such as a celebrity or a user authorized to post on behalf of an organization. When a post is published from the secure user account the post is automatically sent to the buffer user account through a programmatic link, e.g., without logging into the buffer user account, through a server-side programmatic interface.

In some example embodiments, the post is automatically modified to add an icon assigned to the high-profile user or branding information such as a logo. The modified post is then automatically published from the buffer user account so that other users can view and download the modified post. This process can be configured so that the high-profile user simply submits the post and the signature account handles the complex tasks of relaying the post to the buffer account and publishing from the buffer account automatically. In this way, security and privacy of the high-profile user can be maintained while providing a pleasant easy-to-use interface for publishing posts.

In some example embodiments, the secure user account is described by metadata that specifies the secure user account type (e.g., branding, or high-profile user related) and further information, such as logo data and icon data. The values stored in the metadata are used to modify the post (e.g., overlaying an icon on a post from a high-profile user). Posts published through the programmatic link can be published without administrator intervention, thus allowing the high-profile users to quickly publish posts that are more candid in nature. Further, users that follow status updates from a popular user can be assured that the status updates (e.g., posts) are directly from the popular user by use of the icon, which is pulled from metadata and superimposed on the popular user's post to function as a signature of the popular user. Further, privacy and security are maintained because the two accounts (the secure user account and the buffer user account) are linked server-side programmatically and malicious user access to the programmatic link is blocked.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of applications (also referred to as "apps") such as, but not limited to, web browsers, social media apps (e.g., apps to send and receive social media posts, such as text status updates, images, video, and article posts), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. The web client 112 accesses the various systems of the networked system 102 via the web interface supported by a web server 122. Similarly, the programmatic client 116 and client application(s) 114 access the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server 140. The application server(s) 140 host a signature engine 150, which comprises one or more modules or applications and each of which can be embodied as hardware, software, firmware, or any combination thereof, as discussed in further detail below. The application server(s) 140 are, in turn, shown to be coupled to one or more database server(s) 124 that facilitate access to one or more information storage repositories or database(s) 126. In an example embodiment, the database(s) 126 are storage devices that store information to be posted in social media posts, user account information, and user account metadata.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. Further, some functionality of the signature engine 150 can be integrated into the client device 110 or the application server 140. For example, user interface generation and display can be performed entirely on the client device 110 according to some example embodiments, or can be created on the application server 140 and sent to the client device 110 for display, according to some example embodiments.

Figure 2:
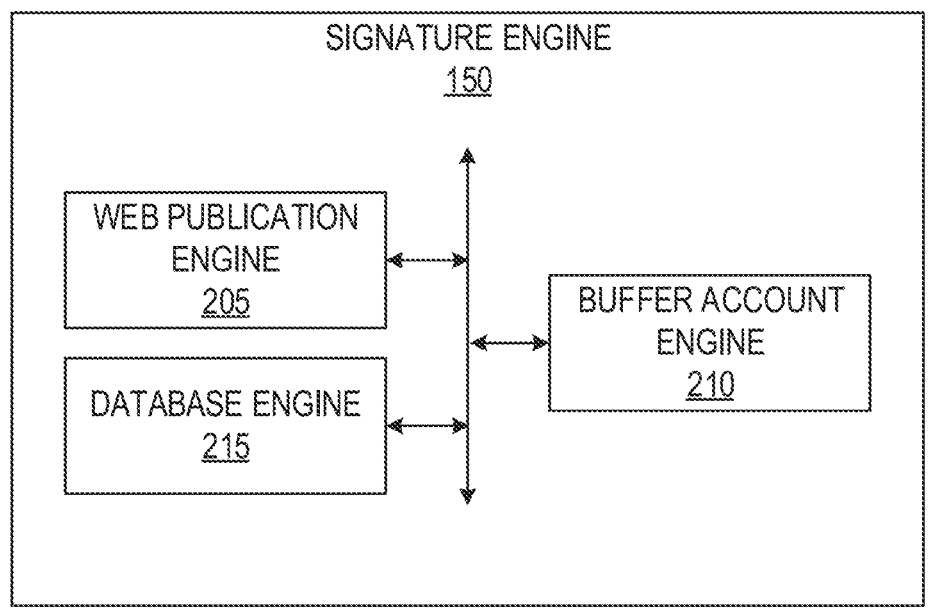
FIG. 2 is a block diagram showing example components provided within the system of FIG. 1, according to some example embodiments.

FIG. 2 illustrates an example signature engine 150, according to some example embodiments. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. In the example illustrated, the signature engine 150 comprises a web publication engine 205, a buffer user account engine 210, and a database engine 215. The web publication engine 205 manages the publication web service for various users as part of a photo and video sharing social network platform (e.g., Snapchat). The publication web service receives posts from users and distributes them to other users for display. In some example embodiments, the posts are ephemeral posts that are configured with a timer. A user can view the ephemeral post until the timer expires, after which point the ephemeral post is logically deleted or no longer available (e.g., the post may still exist on the server-side but is no longer accessible on the client devices). In some example embodiments, the posts include a collection of images (e.g., an individual image, a slide show of images, video data, image overlay data). To distribute posts, a user first creates a user account using the web publication engine 205. Once the account is a created, the user can log into his/her account to record one or more images, modify the images, and post the images to the publication web service using the web publication engine 205. The web publication engine 205 then notifies other users that the user has created a post and sends the post to the users if the users opt to see or download the post.

The buffer user account engine 210 is configured to manage posts created by a secure user account using a buffer account. The secure user account is a user account assigned to a high-profile user (e.g., celebrity, politician, astronaut) that can selectively post to the high-profile user's network of friends (e.g., people they know in real life) or post to the public (e.g., a post viewable to anyone that has a user account on the social network, a post viewable to anyone on the Internet). To maintain the privacy of the high-profile user, when the high-profile user publishes a post to the public, the post is transmitted to a buffer user account (e.g., a shell account) that can modify the post and then publish it. The modified post will have the same look-and-feel as the original post and may further have additional user interface elements (e.g., an icon) that indicates that the post was created by the high-profile user.

In some example embodiments, the secure user account is programmatically linked on the backend (e.g., server-side) with the buffer user account and the high-profile user does not need to provide additional buffer user account log-in information to post through the buffer account. Instead, the user of the secure user account selects a user interface option that directs the post to the public (e.g., via the buffer user account).

In some example embodiments, the buffer user account is a brand account for an organization, such as a company, a political entity, a sports league, or group of people (e.g., a local chess club). Users in the organization use their individual user accounts as the secure user account and post to the brand account by directing their posts through the buffer user account. For example, to create a post for the brand user account, an authorized user (e.g., a student intern authorized by the brand owner) can log into the publication web service using his/her own user account (e.g., secure user account). The authorized user then creates the post, selects an option to publish the post through the brand user account, and selects publish. Once published from the authorized user account, the buffer user account engine 210 publishes the post from the buffer user account, potentially modifying the visual appearance with a superimposed brand logo, according to some example embodiments.

In some example embodiments, the secure user account (e.g., user account of a high-profile user, branding account) is tracked using metadata. The metadata is stored in a database, such as database 126. In some embodiments, when the secure user account publishes a post, the metadata is retrieved from the database by the database engine 215. The buffer user account engine 210 then uses the metadata to perform further actions with the post. For example, in some embodiments, if the metadata indicates that the secure user account is a user account of a high-profile user, the buffer user account engine 210 visually modifies the post with an icon assigned to the high-profile user. The icon functions as a signature for the high-profile user, which informs users of the social network that the post was created by the high-profile user. In some example embodiments, if the metadata indicates that the secure user account is a branding account (e.g., an account of an authorized user), the buffer user account engine 210 publishes the post without visually modifying it (e.g., without adding an icon). Optionally, in some example embodiments, if the metadata indicates that the secure user account is a branding account (e.g., an account of an authorized user), the buffer user account engine 210 modifies the post by adding a logo in a new image layer, then publishes the post to the public. As used here, publishing a post to the public is making the post accessible to users of the publication web service that are not in the user's social network.

Figure 3:
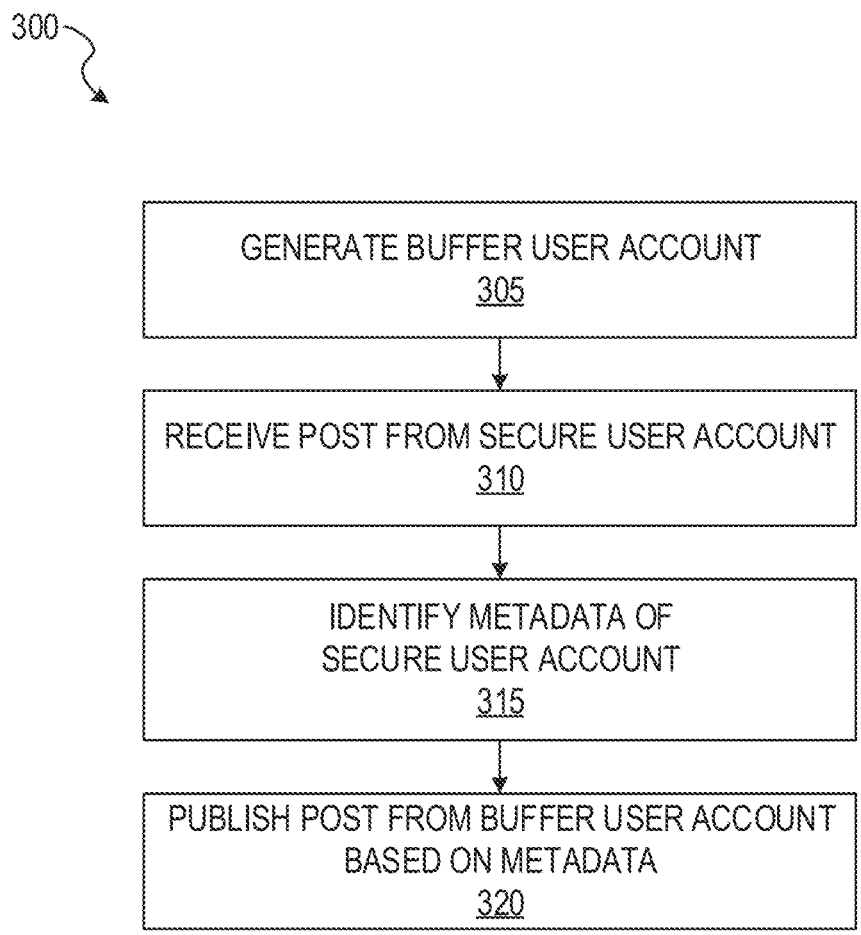
FIG. 3 illustrates a flow diagram of a method for publishing posts using different attribution types, according to some example embodiments.

FIG. 3 illustrates a flow diagram of a method 300 for publishing posts using different attribution types, according to some example embodiments. At operation 305, the buffer user account engine 210 generates a buffer user account for a secure user account. In some example embodiments, during creation of the buffer account, metadata describing the secure user account is stored in the database 126. The metadata is discussed in further detail below with reference to FIG. 4.

At operation 310, the publication web engine 205 receives a request from a secure user account to publish a post. As an example, assume that the request to publish the post specifies that the post is to be published to the public. At operation 315, the buffer user account engine 210 identifies metadata of the secure user account and determines the brand or attribution parameters of the metadata. The brand parameter indicates whether the secure user account is a branding account. The attribution parameter indicates whether the secure user account is an account of a high-profile user. At operation 320, the buffer user account engine 210 publishes the post from the secure user account according to the values in the metadata. For example, if the branding parameter indicates that the post is from a branding account, the post may be published from the buffer user account without visually modifying the post. As an additional example, if the attribution parameter indicates that the secure user account is an account of a high-profile user, the buffer user account engine 210 modifies the post using data from the metadata fields and publishes the modified post from the buffer user account, as described in further detail below.

Figure 4:
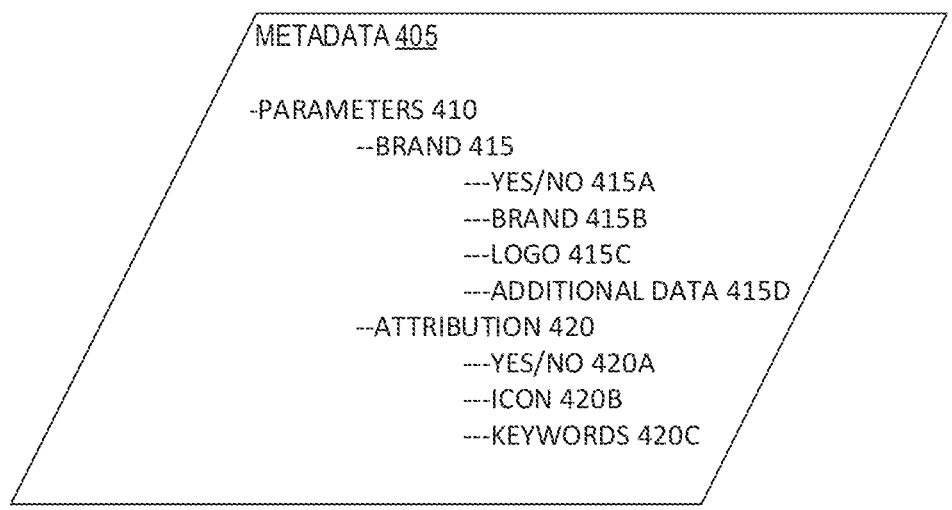
FIG. 4 shows a data structure for user account metadata used for publishing posts using different attribution types, according to some embodiments.

FIG. 4 shows a data structure for metadata 405 that is used for publishing posts using different attribution types, according to some embodiments. Upon creating the buffer user account, the buffer user account engine 210 can store different metadata parameters 410 that describe the secure user account. One metadata parameter includes the brand parameter 415. The brand parameter 415 stores values in one or more fields including field 415a that describes whether the secure user account is a branding account (e.g., storing values such as "YES/NO"), field 415b that stores the brand name (e.g., storing values such as "BRAND NAME"), field 415c that stores logo image data for branding posts (e.g., adding a logo to a post from a branding account), and field 415*d* which stores additional data (e.g., authorized users, additional modifications to be made to a post). An additional metadata parameter includes the attribution parameter 420. The attribution parameter 420 stores values in one or more fields including field 420*a* that describes whether the secure user account is an account of a high-profile user (e.g., storing values such as "YES/NO"), field 420*b* that stores icon image data (e.g., for an icon to be added as a new layer to the post), and field 420*c*, which stores keyword data that describes which search terms should return the high-profile user as a result.

In some example embodiments, the icon assigned to the high-profile user is unique to the high-profile user on the publication web service (e.g., no other users can use the assigned icon and each high-profile user uses a different icon). For example, a politician can be assigned a certain emoji that is only added as an overlay to a post if the post was generated from the user account of the politician. Each individual high-profile user's icon is stored as metadata for the secure user account. In this way, the icon data works as a type of signature for the high-profile account that allows end-users and admins of the publication web service to quickly identify the post as having been submitted by the high-profile user.

The keywords in the field 420*c* describe which search keywords should trigger the high-profile user account being returned as a search result. For example, assume a high-profile user named George Washington has a user account on the publication web service. Further assume that George Washington's user account is set to private and users cannot find his account using a search engine and the account is not viewable even if the user knows George Washington has an account (e.g., the user knows the user name of the account, or has a link to the account). To enable George Washington to securely create public posts without exposing George Washington's original user account, a buffer user account is created and programmatically linked on the backend to George Washington's account using a programmatic interface. A user searching for "George Washington" on a search engine of the publication web service would receive a suggestion to follow an account called "George Washington," which is actually a suggestion to follow the buffer user account linked to George Washington's original account. Additional search term as such as nicknames (e.g., "GeorgieSnaps"), brands, pen names, organizations, or related words are stored in the metadata field 420*c* for George Washington's secure user account. When a user searches for any of the pre-selected keywords, the buffer user account engine 210 checks metadata 405 and returns suggestions to follow the one or more buffer accounts.

Figure 5A:
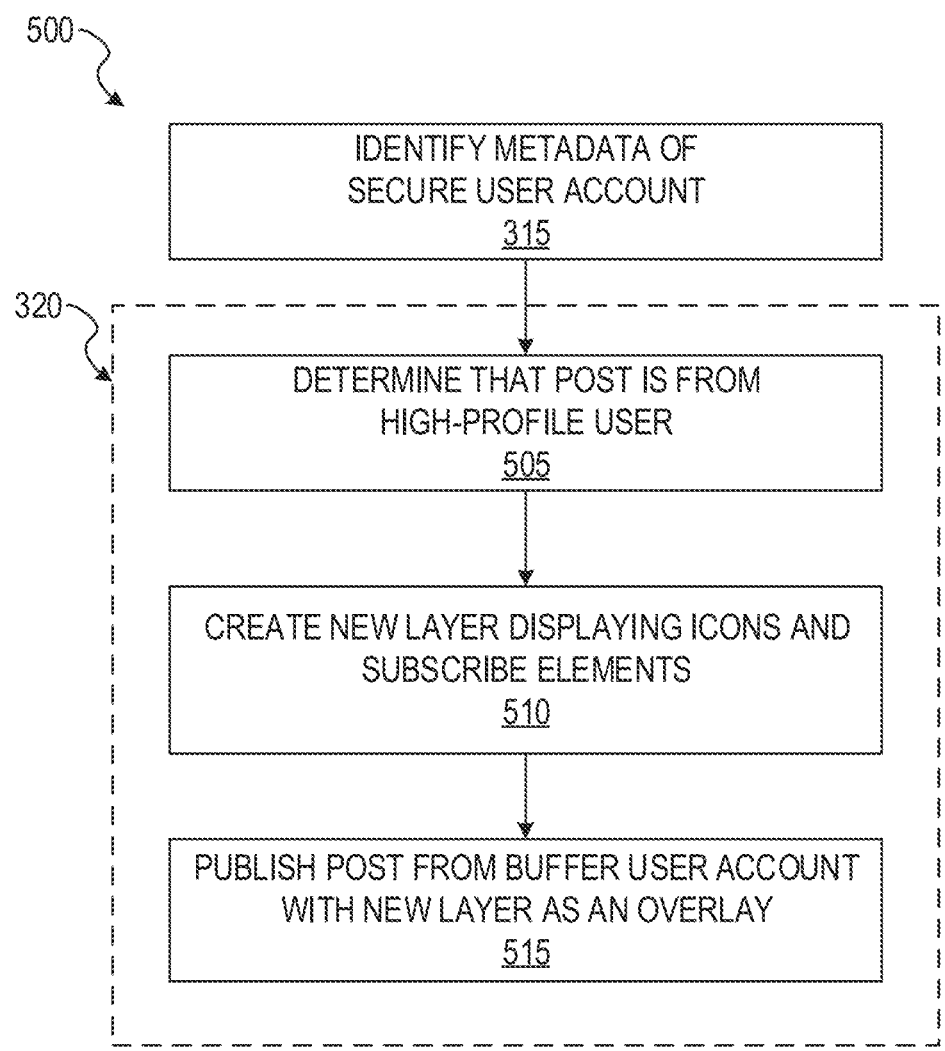
FIG. 5A shows a flow diagram for a method for publishing a post from a secure user account of a high-profile user, according to some example embodiments.

FIG. 5A shows a flow diagram for a method 500 for publishing a post from a secure user account of a high-profile user, according to some example embodiments. In the method 500, operation 315 is from FIG. 3 and is the operation in which the buffer user account engine 210 identifies metadata (e.g., metadata 405) for the secure user account that created the post. Further, operation 320 in FIG. 5A is illustrated as including three additional sub-operations (e.g., operation 505, operation 510, and operation 515) in which the post is published using additional data from the metadata. In particular, at operation 505, the buffer user account engine 210 accesses the attribution field 420*a* to determine that the post is from a high-profile user. At operation 510, the buffer user account engine 210 retrieves the icon data from the icon field 420*b* and adds an image of the icon in a new image layer on the post. Further, according to some example embodiments, at operation 510, the buffer user account engine 210 adds subscribe user elements that allow users viewing the post to subscribe to the high-profile user (e.g., follow, auto-receive future posts created by the high-profile user). At operation 515, the buffer user account engine 210 publishes the modified post from the buffer user account.

Figure 5B:
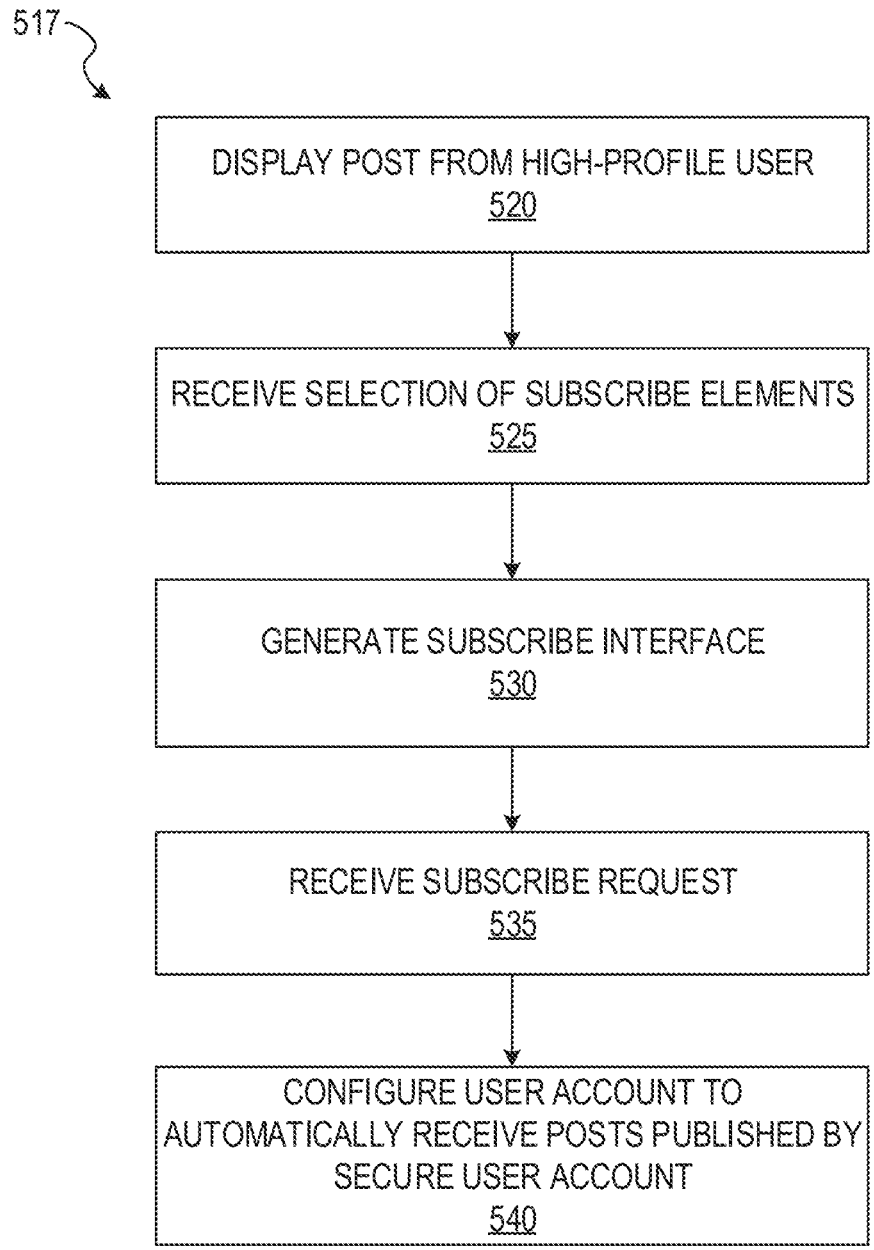
FIG. 5B shows a flow diagram for a method for a user subscribing to the high-profile user using the modified post, according to some example embodiments.

FIG. 5B shows a flow diagram for a method 517 for a user subscribing to the high-profile user using the modified post, according to some example embodiments. At operation 520, the publication web engine 205 displays a post created by the high-profile user (e.g., modified post with icon and subscription user interface (UI) trigger elements added as an overlay). At operation 525, the publication web engine 205 receives a selection of the subscribe UI elements displayed on the post. For example, the user may tap on the portion of the post in which the subscribe user elements are displayed. At operation 530, the publication web engine 205 generates a subscribe user interface with UI elements operable to subscribe the user account to the high-profile user account. At operation 535, the publication web engine 205 receives the subscribe request initiated from the subscription user interface.

At operation 540, the publication web engine 205 configures the user account to automatically receive future posts from the high-profile user (e.g., receive posts from published by the high-profile user through the buffer account). In the operations of method 517, the web publication engine 205 does not need to be specially configured to interpret the request to follow the high-profile user as a request to only follow posts of the high-profile user emanating from the buffer user account. Instead, the publication web engine 205 simply subscribes the user to the buffer user account and the complex functionality of selectively publishing through the buffer user account is handled by the buffer user account engine 210. In this way, (e.g., by allowing the web publication engine 205 to be blind to the buffer user account process), the functionality of the signature engine 150 can be integrated into numerous social networks without requiring large changes to the social network framework.

Figure 6A:
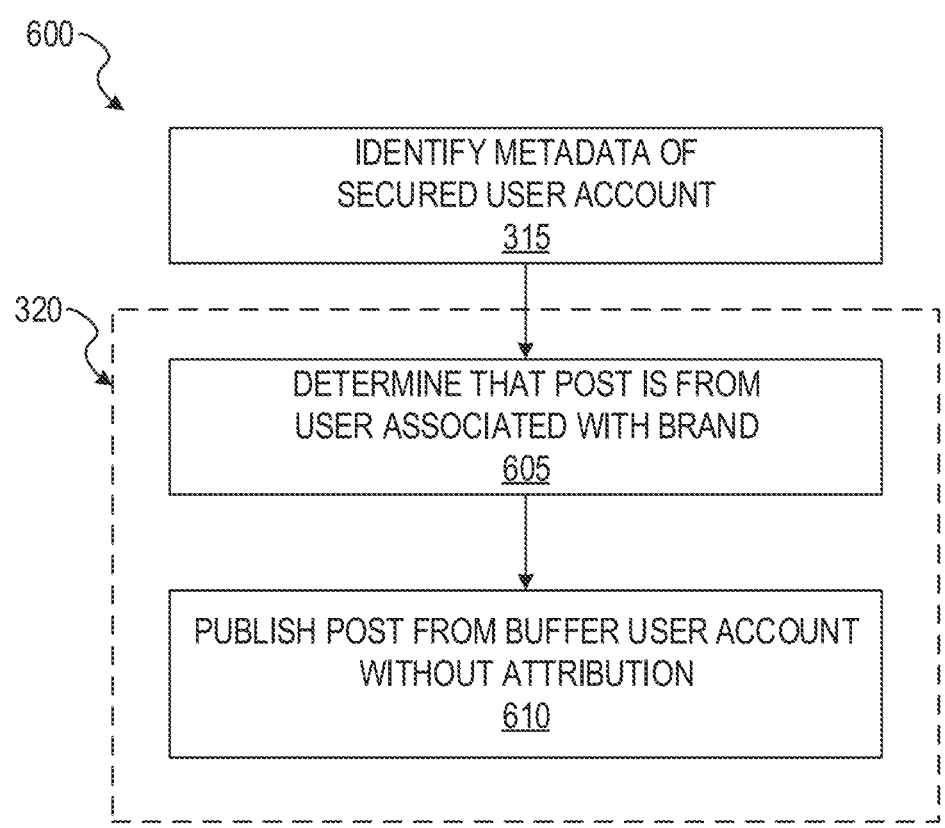
FIG. 6A shows a flow diagram for a method for publishing a post from a secure user account of a branding account in which the post is not visually modified before publicly posting, according to some example embodiments.

FIG. 6A shows a flow diagram for a method 600 for publishing a post from a secure user account of a branding account in which the post is not visually modified before publicly posting, according to some example embodiments. In the method 600, operation 315 is from FIG. 3 and is the operation in which the buffer user account engine 210 identifies metadata (e.g., metadata 405) for the secure user account that created the post. Further, operation 320 in FIG. 6A is illustrated as including two additional sub-operations (e.g., operation 605 and operation 610) in which the post is published using additional data from the metadata. In particular, at operation 605, the buffer user account engine 210 access the brand field 415*a* to determine that the post is from an authorized user (e.g., a user authorized to post to a branding account). At operation 610, the buffer user account engine 210 publishes the post through the buffer user account without visually modifying the post. For example, the post is not published with an icon, logo, or other visual indicators of branding account attribution.

Figure 6B:
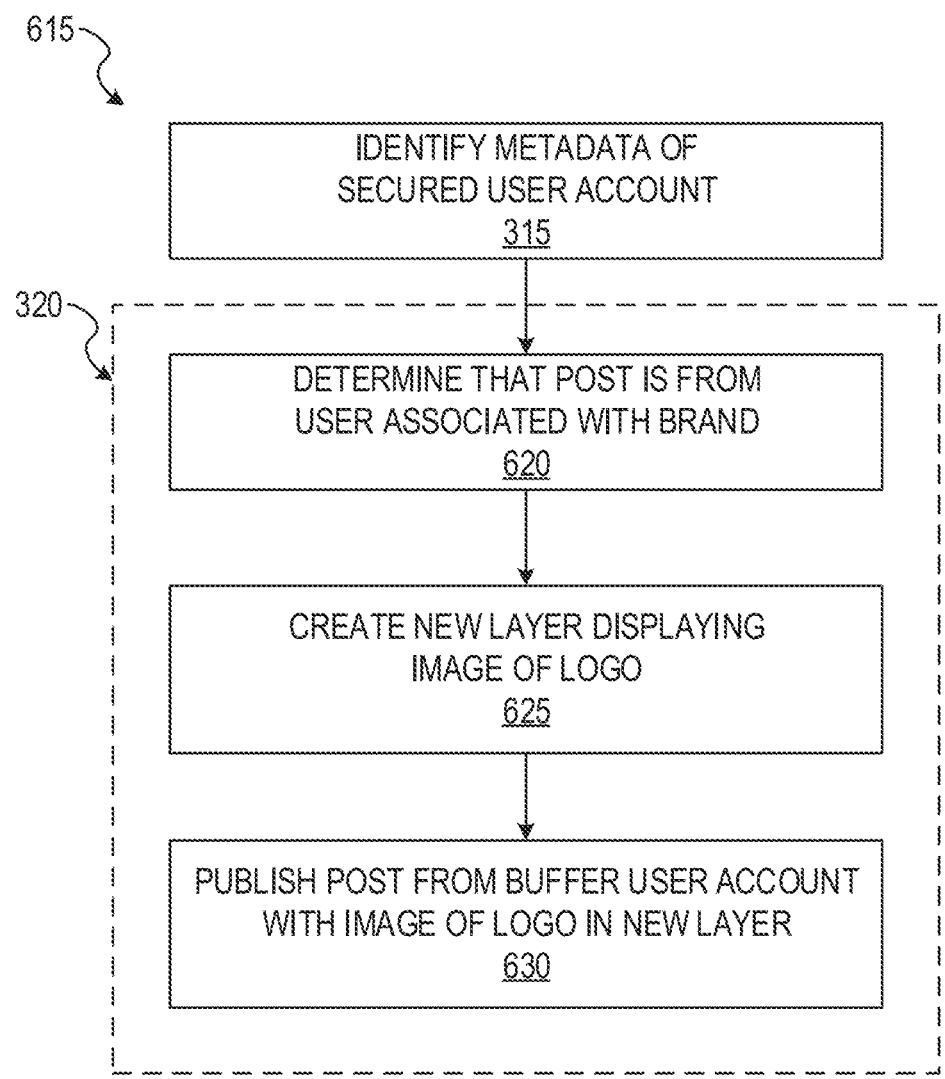
FIG. 6B shows a flow diagram for a method for publishing a post from a secure user account of a branding account in which the post is visually modified with additional branding information, according to some example embodiments.

FIG. 6B shows a flow diagram for a method 615 for publishing a post from a secure user account of a branding account in which the post is visually modified with additional branding information (e.g., logo), according to some example embodiments. In the method 615, operation 315 is from FIG. 3 and is the operation in which the buffer user account engine 210 identifies metadata (e.g., metadata 405) for the secure user account that created the post. Further, operation 320 in FIG. 6B is illustrated as including three additional sub-operations (e.g., operation 620, operation 625, and operation 630) in which the post is published using additional data from the metadata. In particular, at operation 620, the buffer user account engine 210 access the brand field 415a to determine that the post is from an authorized user. At operation 625, the buffer user account engine 210 retrieves the logo data from the logo field 410c and adds an image of the logo into a new image layer on the post (e.g., an overlay). At operation 630, the buffer user account engine 210 publishes the post with the added logo layer from the buffer user account.

Figure 7:
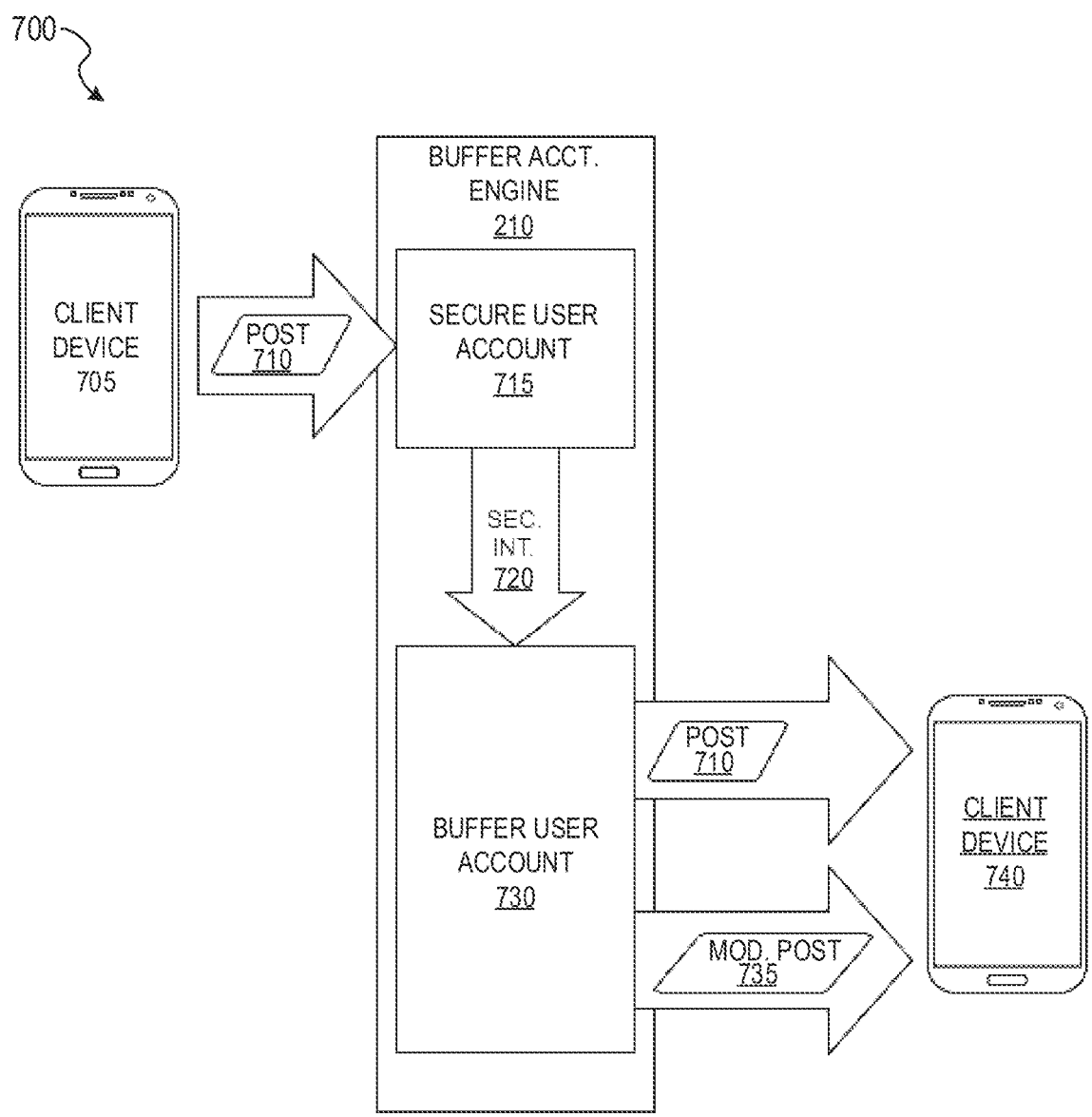
FIG. 7 illustrates a network architecture for publishing posts, according to some example embodiments.

FIG. 7 illustrates a network architecture 700 for publishing posts using the buffer user account engine 210, according to some example embodiments. In the example illustrated, client device 705 is a smartphone of a high-profile user. Assume that the high-profile user has previously used his/her client device 705 to log into his/her secure user account 715 (e.g., logging in via username and password login). The high-profile user records an image and submits it as post 710. Upon submitting, the high-profile user can select to publish the post to his/her network of friends (e.g., friends in the social network), or to publish the post publically using a post path selector interface, which is discussed in further detail below with reference to FIG. 8B. In some embodiments, the user can use the post path selector interface to publish the post directly from his/her secure user account 715 to the user's private network of friends on the social network. By keeping the user's account separate from the buffer user account, the user account is kept more secure since the path from client device 705 through secure user account 715 through programmatic interface 720 through buffer user account 730 to client device 740 is unidirectional in nature. Additionally, by separating the secure user account 715 from the buffer user account 730, authorizing and de-authorizing a user's access to the buffer user account is easier because the buffer user account engine 210 can create and terminate the link (e.g., programmatic interface 720) between the two accounts as need be.

Continuing the example, and assuming the user of client device 705 chooses to publish the post publically (e.g., through buffer user account 730), the buffer user account engine 210 next receives the post 710 from the secure user account 715 and transmits it to buffer user account 730 via the programmatic interface 720. The two accounts, e.g., secure user account 715 and buffer user account 730, are configured to programmatically interact with one another, and the high-profile user does not need to remember or provide additional login information to log into or otherwise use the buffer user account 730. In this way, e.g., the buffer user account is easier to use and more secure since there is less of an attack surface for malicious users to hack (e.g., less login fields, buttons, and portals between the client side and the server-side that malicious users can target in a hack attempt). The buffer user account 730 then access the metadata 405 to determine if the secure user account is associated with a high-profile user or an authorized user of a branding account, as described above. If the secure user account is the account of an authorized user, the buffer user account engine 210 publically publishes the post in unmodified form as post 710, which a user can download and view through client device 740. Alternatively, if the secure user account is the account of a high-profile user, the buffer user account engine 210 retrieves the icon from the metadata and adds the icon as an image overlay in a new image layer of the post. Additionally, according to some embodiments, the buffer user account engine 210 further adds subscription UI trigger elements, as described in further detail below. The post with the new image data as an overlay is then published from buffer user account 730 as modified post 735, which a user can download and view through client device 740.

Figure 8:
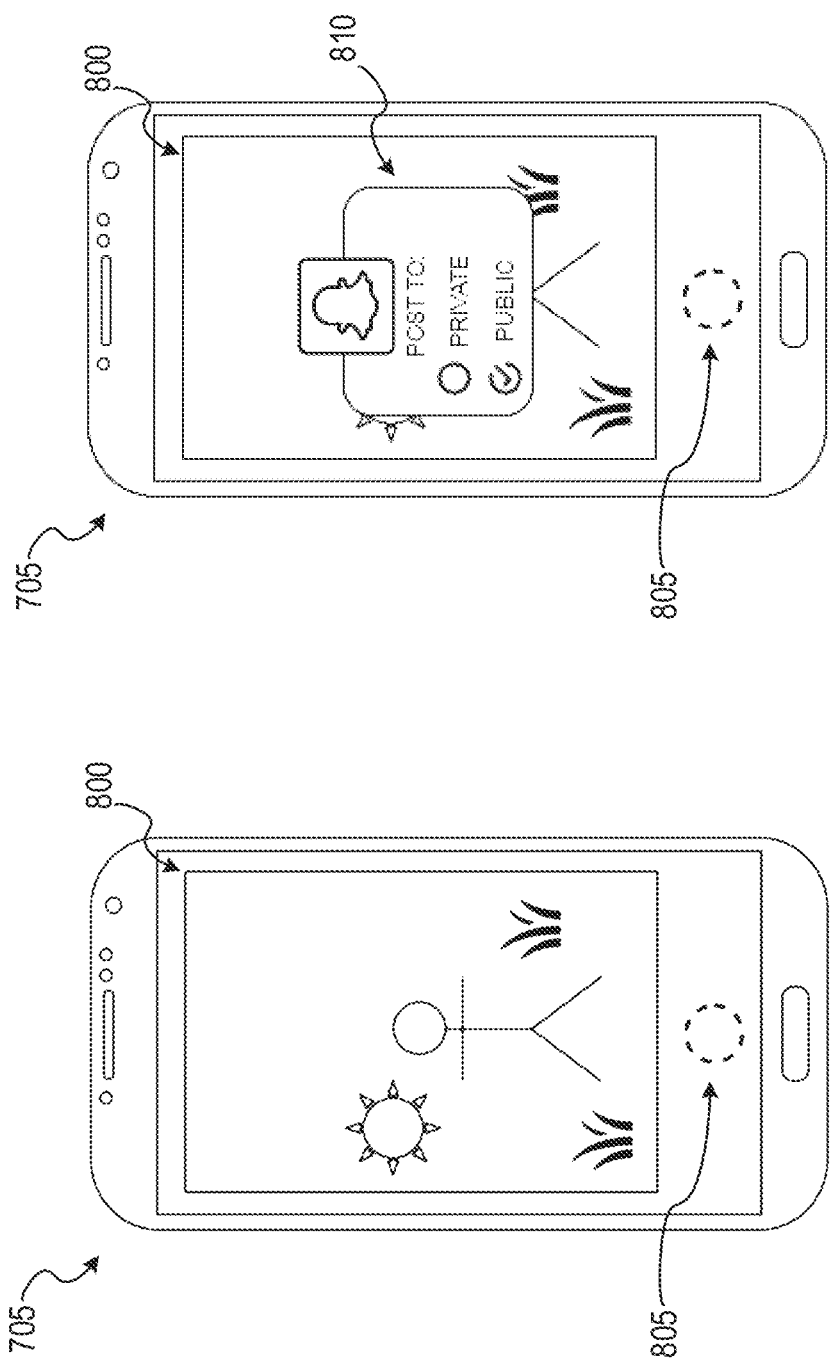
FIG. 8A shows an example of a popular user client device creating a post, according to some example embodiments.
FIG. 8B shows an example of a popular user client device selecting options for post publication, according to some example embodiments.
Figure 9:
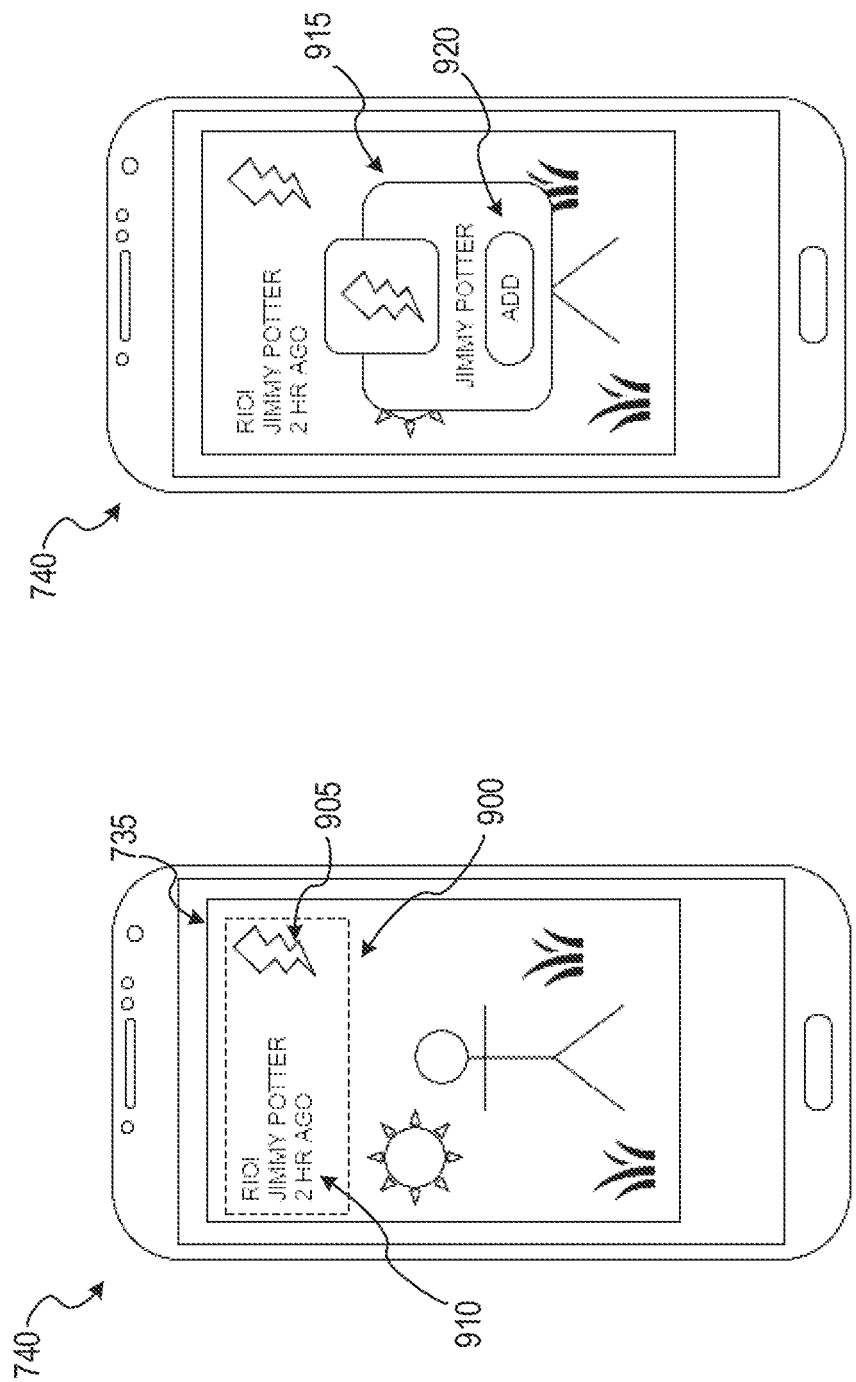
FIG. 9A shows an example of a user client device displaying the published post, according to some example embodiments.
FIG. 9B shows an example of a user client device subscribing to future posts from the high profile user, according to some embodiments.

FIGS. 8A and 8B show example an example client device of a high profile user creating and publishing a post through the buffer user account, according to some embodiments. FIG. 9A shows examples of a client device of an end-user receiving the post and subscribing to the high-profile user, according to some embodiments.

In FIG. 8A, client device 705 (of FIG. 7) is illustrated as a smartphone. The high-profile user can record images by selecting record using record button 805, which causes an image sensor of the client device 705 to capture an image. The capture image is illustrated as post 800. Referring to FIG. 8B, after creating the post, the client device 705 displays a post path selector interface 810 which allows the user to choose between publishing the post to his/her private network (e.g., "Private") or publishing the post publically (e.g., "Public"). If the user selects the private option, the post is published directly from the secure user account 715. Alternatively, if the user selects the public option, the post is published by the buffer user account via the programmatic interface 720.

FIG. 9A shows a client device 740 of a user as a smartphone. The user views the post 800 that was created by the high-profile user as modified post 735. As illustrated, subscribe trigger UI elements 900 (e.g., pre-selected user interface elements such as an icon assigned to user) have been added as an overlay on post 800. The subscribe trigger UI elements 900 include icon 905, which is the unique icon assigned to the high-profile user (e.g., the user using client device 705). The subscribe trigger UI elements 900 further include additional data 910, such as the high-profile user's username (e.g., "JIMMY POTTER") an indication of when the high-profile user published the post (e.g., "2 HR AGO"), and optionally information that indicates the post is part of a sequenced post gallery (e.g., "RIO!"). A sequenced post gallery is a collection of user posts that are shown in sequence to users (e.g., each post is shown for five seconds). With reference to FIG. 9B, in response to selecting or tapping on the subscribe trigger UI elements 900, a subscribe user interface 915 is displayed on client device 740. The subscribe user interface 915 has UI elements such as button 920 that allows the user to submit a request to subscribe or follow posts from the high-profile user. Upon selecting the button 920, the web publication engine 205 configures the user account of the user (e.g., owner of client device 740) to automatically receive future posts from the high-profile user (e.g., receive posts from the high-profile user via buffer user account 730).

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

Figure 10:
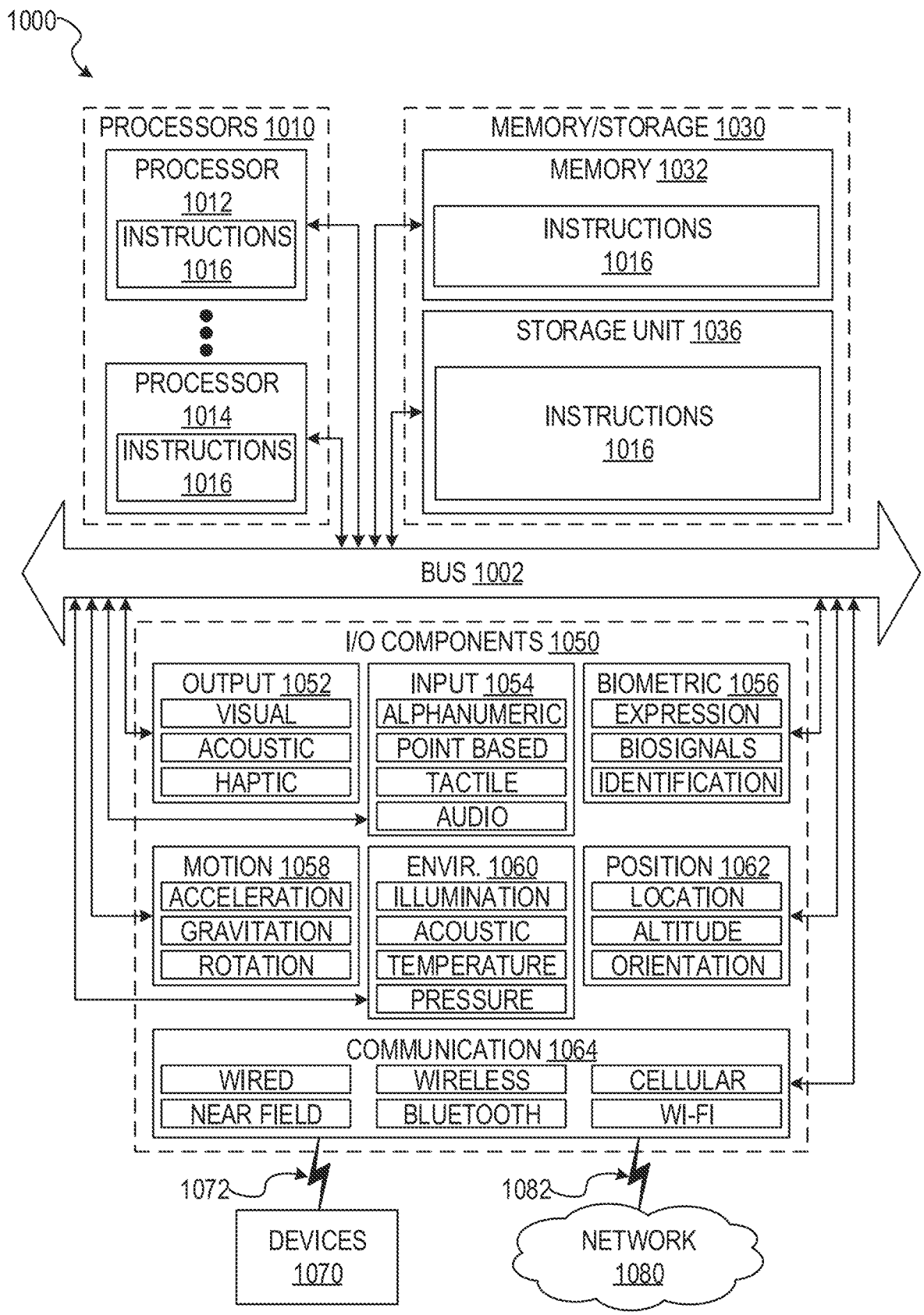
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the flow diagrams of FIGS. 3-6B. Additionally, or alternatively, the instruction 1016 can implement a web publication engine 205, a buffer user account engine 210, and a database engine 215 of FIG. 2, and so forth. The instructions 1016 transform the general, non-programmed machine into a particular machine programmed to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and input/output (I/O) components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 1012 and processor 1014 that may execute instructions 1016. The term "processor" is intended to include multi-core processor that may comprise two or more independent processors (sometimes referred to as "cores") that can execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at a server, a public post instruction for an original post from a first client device associated with a first user account, the public post instruction being selected at the first client device in response to the first client device presenting an option of a private post instruction and the public post instruction, the private post instruction indicating a request to publish the original post, the public post instruction indicating a request to publish a modified post from a buffer account that corresponds to the first user account;

in response to receiving the public post instruction, publishing, at the server, the modified post from the buffer account, the modified post comprising a subscribe trigger graphical user interface comprising an overlay to the original post from the first user account, wherein the subscribe trigger graphical user interface comprises exclusively a unique authenticity icon retrieved from metadata associated with the first user account, the unique authenticity icon serving simultaneously as a visual authentication marker and as an interactive subscribe control that is capable of capturing a subscription event via a selection of the subscribe trigger graphical user interface;

in response to detecting the selection of the subscribe trigger graphical user interface displaying a subscribe user interface element on the modified post, the subscribe user interface element comprising a subscription button and the unique authenticity icon;

detecting, from a second user account, a selection of the subscription button on the modified post; and in response to detecting the selection of the subscription button on the modified post, subscribing the second user account to posts published by the buffer account.

2. The method of claim 1, further comprising:
identifying the buffer account corresponding to the first user account, and metadata of the first user account, the metadata indicating a graphical element assigned to the first user account; and
generating, at the server, the modified post by overlaying the graphical element on the original post, the graphical element indicating an authenticity of the buffer account.

3. The method of claim 2, wherein the subscribe trigger graphical user interface comprises the graphical element assigned to the first user account, a username of the first user account, an indication of when the first user account published the modified post, and information indicating that the modified post is part of a sequenced post gallery.

4. The method of claim 3, wherein the graphical element includes a unique icon assigned to the first user account.

5. The method of claim 3, wherein the graphical element comprises a logo or an icon, wherein the modified post is accessible by all users on a social network platform.

6. The method of claim 2, wherein the metadata includes a brand parameter and an attribution parameter,
wherein the brand parameter indicates whether the first user account is a branding account, a brand name, logo image data, and authorized users of a social network platform, and
the attribution parameter indicating whether the first user account is a high-profile user of the social network platform, icon image data, and keywords data associated with the high-profile user.

7. The method of claim 1, further comprising:
in response to detecting the selection of the subscribe trigger graphical user interface on the modified post, presenting a subscribe user interface on a device of the second user account, the subscribe user interface comprising a button user interface; and
detecting a selection of the button user interface from the second user account,
wherein subscribing the second user account to posts published by the buffer account is in response to detecting the selection of the button user interface from the second user account.

8. The method of claim 1, wherein the original post comprises an image generated by an image sensor of a device of the first user account,
wherein the modified post is published as an ephemeral message on a social network platform.

9. The method of claim 1, wherein publishing the modified post further comprises:
publishing the modified post as part of a sequenced user post gallery that displays posts from the buffer account in sequence.

10. The method of claim 1, further comprising:
in response to detecting the selection of the public post instruction in the request, identifying the buffer account corresponding to the first user account, and metadata of the first user account, the metadata indicating a graphical element assigned to the first user account, wherein the overlay comprises the graphical element.

11. A system comprising:
one or more processors of a machine; and
a memory storing instructions that, when executed by the one or more processors of the machine, cause the machine to perform operations comprising:
receiving a public post instruction for an original post from a first client device associated with a first user account, the public post instruction being selected at the first client device in response to the first client device presenting an option of a private post instruction and the public post instruction, the private post instruction indicating a request to publish the original post, the public post instruction indicating a request to publish a modified post from a buffer account that corresponds to the first user account;

in response to receiving the public post instruction, publishing the modified post from the buffer account, the modified post comprising a subscribe trigger graphical user interface comprising an overlay to the original post from the first user account, wherein the subscribe trigger graphical user interface comprises exclusively a unique authenticity icon retrieved from metadata associated with the first user account, the unique authenticity icon serving simultaneously as a visual authentication marker and as an interactive subscribe control that is capable of capturing a subscription event via a selection of the subscribe trigger graphical user interface;

in response to detecting the selection of the subscribe trigger graphical user interface, displaying a subscribe user interface element on the modified post, the subscribe user interface element comprising a subscription button and the unique authenticity icon:

detecting, from a second user account, a selection of the subscription button on the modified post; and in response to detecting the selection of the subscription button on the modified post, subscribing the second user account to posts published by the buffer account.

12. The system of claim 11, wherein the operations further comprise:
identifying the buffer account corresponding to the first user account, and metadata of the first user account, the metadata indicating a graphical element assigned to the first user account; and
generating the modified post by overlaying the graphical element on the original post, the graphical element indicating an authenticity of the buffer account.

13. The system of claim 12, wherein the subscribe trigger graphical user interface comprises the graphical element assigned to the first user account, a username of the first user account, an indication of when the first user account published the modified post, and information indicating that the modified post is part of a sequenced post gallery.

14. The system of claim 13, wherein the graphical element includes a unique icon assigned to the first user account.

15. The system of claim 13, wherein the graphical element comprises a logo or an icon, wherein the modified post is accessible by all users on a social network platform.

16. The system of claim 12, wherein the metadata includes a brand parameter and an attribution parameter,
wherein the brand parameter indicates whether the first user account is a branding account, a brand name, logo image data, and authorized users of a social network platform, and
the attribution parameter indicating whether the first user account is a high-profile user of the social network platform, icon image data, and keywords data associated with the high-profile user.

17. The system of claim 11, further comprising:
in response to detecting the selection of the subscribe trigger graphical user interface on the modified post, presenting a subscribe user interface on a device of the second user account, the subscribe user interface comprising a button user interface; and
detecting a selection of the button user interface from the second user account,
wherein subscribing the second user account to posts published by the buffer account is in response to detecting the selection of the button user interface from the second user account.

18. The system of claim 11, wherein the original post comprises an image generated by an image sensor of a device of the first user account,
wherein the modified post is published as an ephemeral message on a social network platform.

19. The system of claim 11, wherein publishing the modified post further comprises:
publishing the modified post as part of a sequenced user post gallery that displays posts from the buffer account in sequence.

20. A non-transitory machine-readable storage device embodying instruction that, when executed by a machine, cause the machine to perform operations comprising:
receiving, at a server, a public post instruction for an original post from a first client device associated with a first user account, the public post instruction being selected at the first client device in response to the first client device presenting an option of a private post instruction and the public post instruction, the private post instruction indicating a request to publish the original post, the public post instruction indicating a request to publish a modified post from a buffer account that corresponds to the first user account;
in response to receiving the public post instruction, publishing the modified post from the buffer account, the modified post comprising a subscribe trigger graphical user interface comprising an overlay to the original post from the first user account, wherein the subscribe trigger graphical user interface comprises exclusively a unique authenticity icon retrieved from metadata associated with the first user account, the unique authenticity icon serving simultaneously as a visual authentication marker and as an interactive subscribe control that is capable of capturing a subscription event via a selection of the subscribe trigger graphical user interface;
in response to detecting the selection of the subscribe trigger graphical user interface, displaying a subscribe user interface element on the modified post, the subscribe user interface element comprising a subscription button and the unique authenticity icon;
detecting, from a second user account, a selection of the subscription button on the modified post; and
in response to detecting the selection of the subscribe trigger graphical user interface subscription button on the modified post, subscribing the second user account to posts published by the buffer account.

* * * * *

UNITED STATES PATENT AND TRADEMARK OFFICE
CERTIFICATE OF CORRECTION

| | | |
|---|---|---|
| PATENT NO. | : 12,469,090 B2 | Page 1 of 1 |
| APPLICATION NO. | : 18/608366 | |
| DATED | : November 11, 2025 | |
| INVENTOR(S) | : Allen et al. | |

It is certified that error appears in the above-identified patent and that said Letters Patent is hereby corrected as shown below:

In the Claims

In Column 17, Line 17, in Claim 1, after "interface", insert --,--

In Column 18, Line 50, in Claim 11, delete "icon:" and insert --icon;-- therefor In Column 20, Lines 35-36, in Claim 20, before "subscription", delete "subscribe trigger graphical user interface"

Signed and Sealed this
Third Day of February, 2026

John A. Squires
*Director of the United States Patent and Trademark Office*